United States Patent
Wynn

(10) Patent No.: US 9,582,393 B2
(45) Date of Patent: Feb. 28, 2017

(54) METHOD TO FACILITATE RAPID DEPLOYMENT AND RAPID REDEPLOYMENT OF AN INFORMATION HANDLING SYSTEM

(71) Applicant: Dell Products, LP, Round Rock, TX (US)

(72) Inventor: Allen C. Wynn, Round Rock, TX (US)

(73) Assignee: DELL PRODUCTS, LP, Round Rock, TX (US)

(*) Notice: Subject to any disclaimer, the term of this patent is extended or adjusted under 35 U.S.C. 154(b) by 251 days.

(21) Appl. No.: 14/310,188

(22) Filed: Jun. 20, 2014

(65) Prior Publication Data
US 2015/0370576 A1 Dec. 24, 2015

(51) Int. Cl.
G06F 9/44 (2006.01)
G06F 11/30 (2006.01)

(52) U.S. Cl.
CPC ........ G06F 11/3024 (2013.01); G06F 9/4401 (2013.01); G06F 11/3055 (2013.01)

(58) Field of Classification Search
CPC . G06F 11/3024; G06F 11/3055; G06F 9/4401
See application file for complete search history.

(56) References Cited

U.S. PATENT DOCUMENTS

| | | | |
|---|---|---|---|
| 8,380,760 B2 | 2/2013 | Johnson et al. | |
| 2003/0084337 A1* | 5/2003 | Simionescu | G06F 9/4416 713/190 |
| 2003/0145008 A1 | 7/2003 | Burrell | |
| 2004/0088692 A1* | 5/2004 | Stutton | G06F 9/4406 717/168 |
| 2008/0104386 A1* | 5/2008 | Van Rooyen | G06F 9/4401 713/2 |
| 2008/0126586 A1 | 5/2008 | Shih | |
| 2009/0019278 A1 | 1/2009 | Shah et al. | |
| 2012/0191960 A1* | 7/2012 | Piwonka | G06F 9/441 713/2 |
| 2013/0311763 A1* | 11/2013 | Saborowski | G06F 9/445 713/2 |
| 2013/0346738 A1* | 12/2013 | Kimura | G06F 21/575 713/2 |
| 2014/0046645 A1* | 2/2014 | White | G06F 17/509 703/13 |
| 2014/0230078 A1* | 8/2014 | Graham | G06F 21/31 726/30 |
| 2015/0074386 A1* | 3/2015 | Huang | G06F 9/4401 713/2 |

* cited by examiner

*Primary Examiner* — Thomas Lee
*Assistant Examiner* — Chad Erdman
(74) *Attorney, Agent, or Firm* — Larson Newman, LLP

(57) ABSTRACT

An information handling system includes a processor, a Unified Extensible Firmware Interface (UEFI) boot volume, and a memory including UEFI code and a setup module. The UEFI code is executable by the processor to boot the information handling system, determine if the UEFI boot volume includes a setup data file, and launch the setup module in response to determining that the UEFI boot volume includes the setup data file. The setup module is executable by the processor to read first information from the setup data file, and set a first configuration setting of the information handling system based upon the first information.

17 Claims, 4 Drawing Sheets

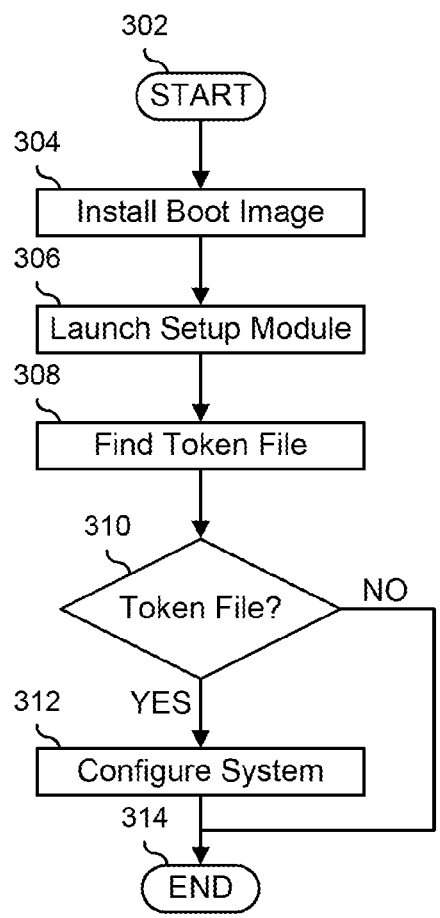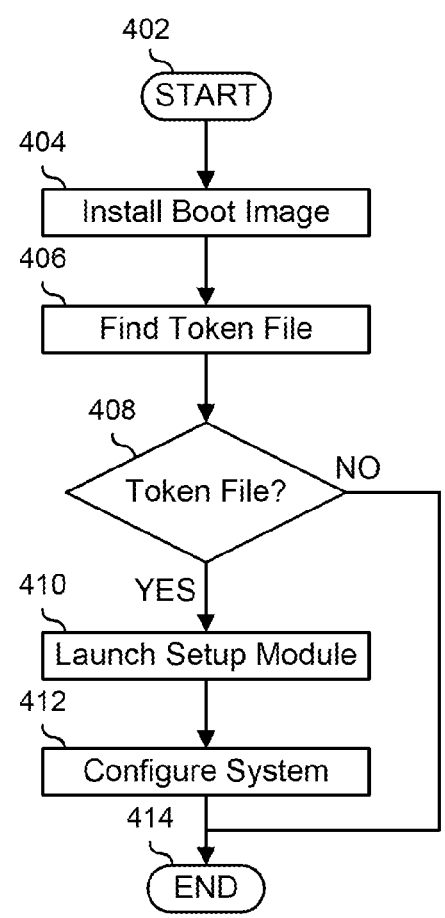
FIG. 3
FIG. 4

METHOD TO FACILITATE RAPID DEPLOYMENT AND RAPID REDEPLOYMENT OF AN INFORMATION HANDLING SYSTEM

FIELD OF THE DISCLOSURE

This disclosure relates generally to information handling systems, and more particularly relates to facilitating rapid deployment and redeployment of a Unified Extensible Firmware Interface (UEFI) system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. A unified extensible firmware interface (UEFI) can provide an interface between the hardware and firmware of the information handling system and an operating environment of the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIGS. 3 and 4 are flowcharts illustrating methods for configuring a UEFI system.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
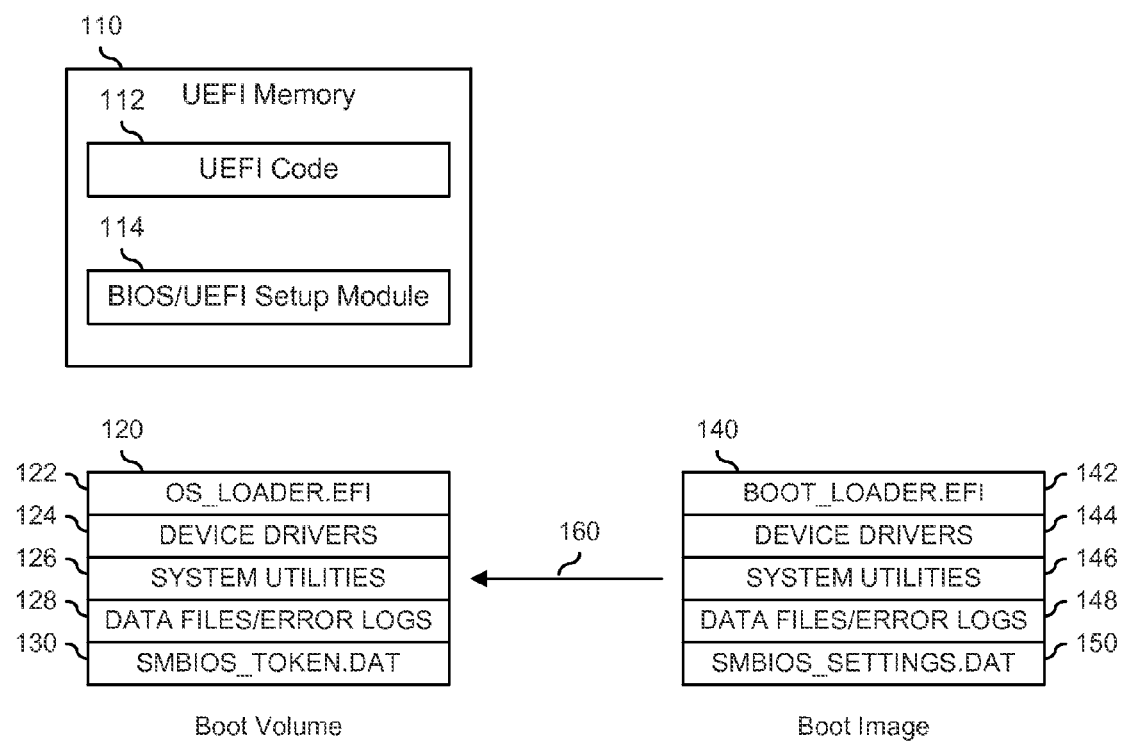
FIG. 1 is a block diagram of an information handling system according to an embodiment of the present disclosure.

FIG. 1 illustrates an information handling system 100 including a Unified Extensible Firmware Interface (UEFI) memory 110, a storage volume 120. For the purpose of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

UEFI memory 110 includes UEFI code 112 for booting and operating information handling system 100, and code for implementing a software Basic Input/Output System (BIOS)/UEFI setup module 114. In a particular embodiment, UEFI memory 110 is a non-volatile random access memory (NV-RAM), such as a flash memory device. Storage volume 120 represents a bootable storage medium that is accessible to UEFI code 112 for storage and retrieval of information including data and executable code. The skilled artisan will recognize that storage volume 120 can represent an individual data storage device, such as a disk drive, a USB storage device, or another data storage device, can represent a logical partition of an individual storage device, or a combination thereof. In a particular embodiment, storage volume 120 is configured according to a Globally Unique Identifier (GUID) Partition Table (GPT) format, and the data included in the storage volume is stored on a partition that is configured according to one or more of a FAT12, a FAT16, and a FAT 32 variant of a File Allocation Table (FAT) format.

Storage volume 120 represents a boot volume for information handling system 100. As such, storage volume 120 includes a boot loader file 122 named os_loader.efi that includes executable code that implements a boot loader for installing a particular operating system, one or more device drivers 124 that are installed during boot up to provide access to one or more components of information handling system 100, one or more system utilities 126 that are executed during boot up, various data files and error logs 128, and a System Management BIOS (SMBIOS) token file 130 named smbios_token.dat that is used for configuring the information handling system, as described below. SMBIOS token file 130 includes information that is accessed by UEFI code 112 and BIOS/UEFI setup module 114 to set or change one or more configuration settings of information handling system 100, including CMOS tokens that are associated with each configuration setting. An example of a CMOS token includes a system hardware configuration token such as an IDE or serial port configuration token, a system auto-on configuration token, a boot configuration token such as a boot order or a boot device list token, a power or reset button enable configuration token, another CMOS token, or a combination thereof. SMBIOS token file 130 includes other configuration information including BIOS setting information. An example of BIOS setting information includes ACPI suspend state information, after power failure power state information, power and voltage control information, password information including password change on first boot information, IP address and DNS information, other BIOS setting information, or a combination thereof. The skilled artisan will understand that the above examples are not intended as comprehensive lists of configuration settings for information handling system 100, and that SMBIOS token file 130 can include settings for any available configuration setting of the information handling system that may normally be associated with a BIOS setup screen or other setup utility for configuring the information handling system prior to a boot up sequence.

BIOS/UEFI setup module 114 operates to configure information handling system 100 based upon the information included in SMBIOS token file 130. In a particular embodiment, each time information handling system 100 is booted up, BIOS/UEFI setup module 114 is invoked to read the information included in SMBIOS token file 130 and sets the associated configuration settings of the information handling system in accordance with the information. Here, BIOS/UEFI setup module 114 provides an indication upon each boot up of information handling system 100 as to whether or not any of the configuration settings have been changed since the previous boot up of the information handling system. In another embodiment, BIOS/UEFI setup module 114 operates to read the information included in SMBIOS token file 130 and sets the associated configuration settings of the information handling system in accordance with the information only on an initial boot up of the information handling system. In one case, UEFI code 112 detects whether or not SMBIOS token file 130 is present on storage volume 120, and if the SMBIOS token file is present, then the UEFI code invokes BIOS/UEFI setup module 114 to perform the configuration operations on information handling system 100. Here, BIOS/UEFI setup module 114 operates to rename SMBIOS token file 130, such that, on subsequent boots of information handling system 100, UEFI code 112 fails to detect the presence of SMBIOS token file 130, and thus BIOS/UEFI setup module 114 is not invoked on subsequent boots of the information handling system. For example, UEFI code 112 can search for a file named smbios_token.dat, and BIOS/UEFI setup module 114 can rename the file to smbios_toke.old.

In another embodiment, UEFI memory 110 does not include BIOS/UEFI setup module 114. Here, SMBIOS token file 130 includes executable code for performing the functions of BIOS/UEFI setup module 114, as described above. In this case, SMBIOS token file 130 can have a name that indicates that the file includes executable code, such as smbios_token.efi, smbios_token.exe, or the like. Further, as noted above, SMBIOS token file 130 can be invoked by UEFI code 112 on each boot up, or can be invoked one time, and the executable code can operate to rename the file for subsequent boots.

When information handling system 100 is originally configured, storage volume 120 is an empty storage volume and a boot image 140 is installed 160 to the storage volume. Boot image 140 includes a master copy 142 of boot loader file 122, a master copy 144 of the one or more device drivers 124, a master copy 146 of the one or more system utilities 126, a master copy 148 of the files and error logs 128, and a master copy 150 of the SMBIOS settings file 130. Similarly, when information handling system 100 is reconfigured, for example, after being serviced, updated, or refitted, storage volume 120 has boot image 140 reinstalled onto the storage volume. In this way, information handling system 100 is provided with the ability to configure itself directly from the state where boot image 140 is installed 160 onto storage volume 120, and no separate steps are needed to configure the information handling system. Here, a user merely starts information handling system 100 and BIOS/UEFI setup module 114 is invoked to configure the information handling system, without any need for separate configuration steps being performed by the user.

Figure 2:
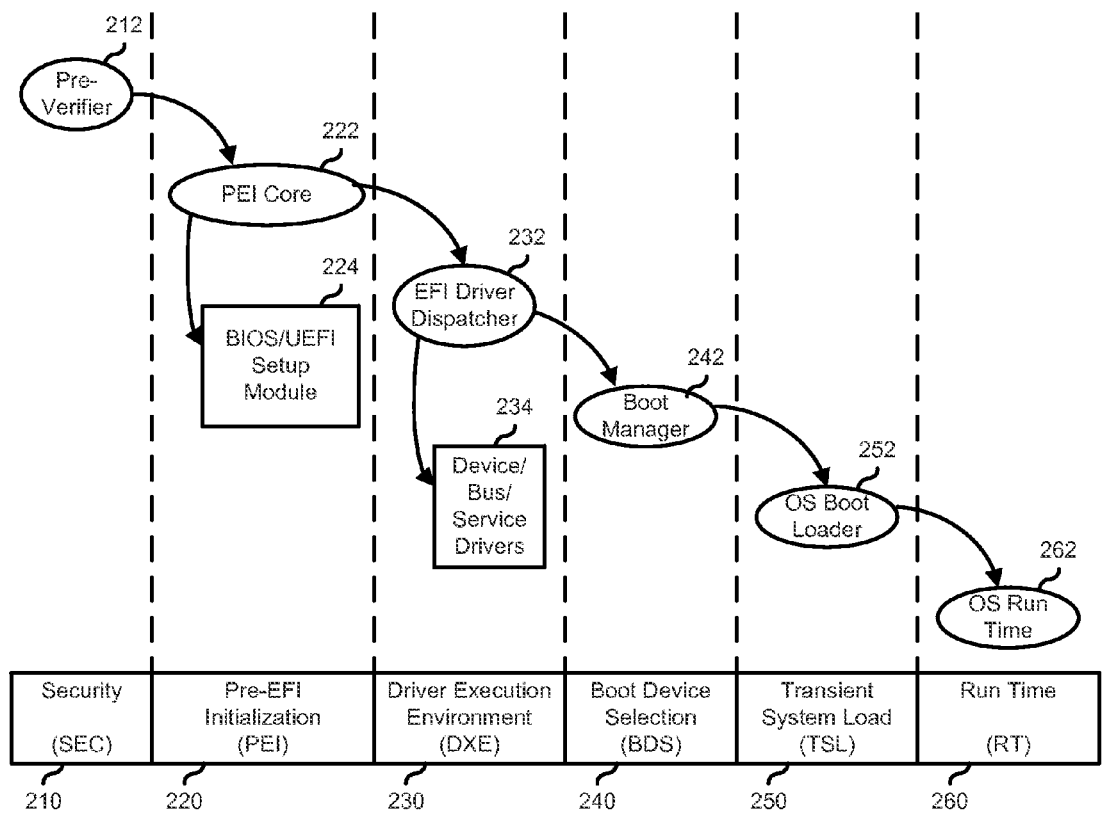
FIG. 2 is a phase diagram for a UEFI boot of the information handling system of FIG. 1.

FIG. 2 illustrates a phase diagram 200 for an information handling system that operates using a UEFI, including a security phase (SEC) 210, a pre-EFI initialization phase (PEI) 220, a driver execution environment phase (DXE) 230, a boot device selection phase (BDS) 240, a transient system load phase (TSL) 250, and a run time phase (RT) 260. SEC 210 is the first phase of a UEFI boot process on the information handling system that operates to set up a pre-verifier 212. Pre-verifier 212 handles all restart events on the information handling system, and temporarily allocates a portion of memory for use during the other boot phases. SEC 210 is executed out of the firmware resident on the information handling system, and so serves as a root of trust for the system.

SEC 210 passes execution to PEI 220 which initializes the system memory for the information handling system. PEI 220 sets up a PEI core 222 that includes a BIOS/UEFI setup module 224 similar to BIOS/UEFI setup module 114. PEI 220 passes execution to DXE 230 which performs device specific initializations for the information handling system. In particular, DXE 230 executes an EFI driver dispatcher 232 that operates to load device, bus, and service drivers 234. DXE 230 passes execution to BDS 240 which executes a boot manager 242. Boot manager 242 also identifies a boot target, and passes execution to TSL 250. TSL 250 launches an OS boot loader 252 which loads the operating system, and passes execution to the operating system at RT 260.

FIG. 3 illustrates a method for configuring a UEFI system starting at block 302. A boot image is installed on a storage volume of an information handling system in block 304. For example, boot image 140 can be installed 160 onto storage volume 120. A setup module is launched as part of the boot up of the information handling system in block 306. For example, BIOS/UEFI setup module 114 can be launched by UEFI code 112. The setup module searches the storage volume to find a token file in block 308. For example, BIOS/UEFI setup module 114 can determine that storage volume 120 includes SMBIOS token file 130. A decision is made as to whether or not a token file is found in decision block 310. If not, the "NO" branch of decision block 310 is taken and the method ends at block 314. If a token file is found, the "YES" branch of decision block 310 is taken, the setup module configures the information handling system based upon the information in the token file in block 312, and the method ends in block 314.

FIG. 4 illustrates another method for configuring a UEFI system starting at block 402. A boot image is installed on a storage volume of an information handling system in block 404. For example, boot image 140 can be installed 160 onto storage volume 120. UEFI code on the information handling system searches the storage volume to find a token file in block 406. For example, UEFI codes 112 can determine that storage volume 120 includes SMBIOS token file 130. A decision is made as to whether or not a token file is found in decision block 408. If not, the "NO" branch of decision block 408 is taken and the method ends at block 414. If a token file is found, the "YES" branch of decision block 408 is take and the UEFI code launches a setup module in block 410. For example, UEFI code 112 can launch BIOS/UEFI setup module 114. The setup module configures the information handling system based upon the information in the token file in block 412, and the method ends in block 414.

Figure 5:
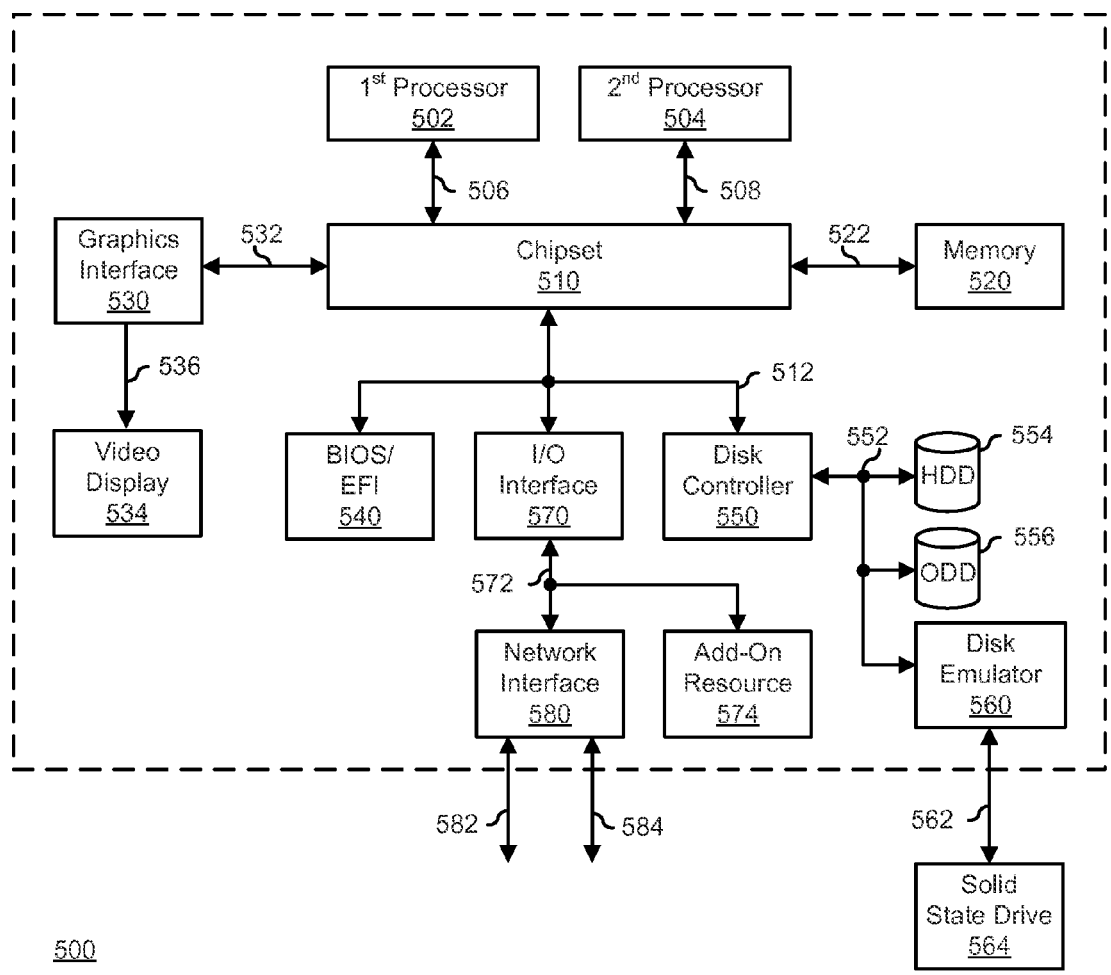
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI) module 540, a disk controller 550, a disk emulator 560, an input/output (I/O) interface 570, and a network interface 580. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574 and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
    a processor; and
    a Unified Extensible Firmware Interface (UEFI) boot volume including a setup module; and a memory including UEFI code;
    wherein the UEFI code is executable by the processor to:
        boot the information handling system;
        determine if the UEFI boot volume includes a setup data file; and
        launch the setup module in response to determining that the UEFI boot volume includes the setup data file; and
    wherein the setup module is executable by the processor to:
        read first information from the setup data file; and
        set a first configuration setting of the information handling system based upon the first information;
    wherein the setup module is further executable to:
        read second information from the setup data file;
        read a second configuration setting of the information handling system;
        determine that the second configuration setting has been changed based upon the second information; and
        provide an error indication that the configuration setting has been changed.

2. The information handling system of claim 1, wherein the setup module is further executable to: set the second configuration setting based upon the second information.

3. The information handling system of claim 1, wherein:
    the setup data file has a first predetermined file name; and
    in determining if the UEFI boot volume includes the setup data file, the UEFI code is further executable to search the UEFI boot volume for the first predetermined file name.

4. The information handling system of claim 3, wherein the setup module is further executable to:
    rename the setup data file to a second predetermined file name after setting the first configuration setting.

5. The information handling system of claim 4, wherein the UEFI code is further executable to:
    reboot the information handling system; and
    determine that the UEFI boot volume does not include the setup data file based upon the renaming of the setup data file.

6. The information handling system of claim 1, wherein the UEFI boot volume is provided with the setup data file based upon a boot image.

7. A method comprising:
    accessing, by an information handling system, a Unified Extensible Firmware Interface (UEFI) boot volume, the UEFI boot volume including a setup module, and a memory including UEFI code;
    booting, by the UEFI code, the information handling system;
    determining, by the UEFI code, if the UEFI boot volume includes a setup data file;
    launching, by the UEFI code, the setup module in response to determining that the UEFI boot volume includes the setup data file;
    reading, by the setup module, first information from the setup data file; and
    setting, by the setup module, a first configuration setting of the information handling system based upon the first information;
    reading, by the setup module, second information from the setup data file;
    reading, by the setup module, a second configuration setting of the information handling system;
    determining, by the setup module, that the second configuration setting has been changed based upon the second information; and
    providing an error indication that the configuration setting has been changed.

8. The method of claim 7, further comprising:
    setting, by the setup module, the second configuration setting based upon the second information.

9. The method of claim 7, wherein:
    the setup data file has a first predetermined file name; and
    in determining if the UEFI boot volume includes the setup data file, the method further comprises searching, by the UEFI code, the UEFI boot volume for the first predetermined file name.

10. The method of claim 9, further comprising:
    renaming, by the setup module, the setup data file to a second predetermined file name after setting the first configuration setting.

11. The method of claim 10, further comprising:
    Rebooting, by the UEFI code, the information handling system; and determining, by the UEFI code, that the UEFI boot volume does not include the setup data file based upon the renaming of the setup data file.

12. The method of claim 7, wherein the UEFI boot volume is provided with the setup data file based upon a boot image.

13. An information handling system comprising:
a processor; and
a Unified Extensible Firmware Interface (UEFI) boot volume including
a setup file;
and a memory including UEFI code;
wherein the UEFI code is executable by the processor to:
boot the information handling system;
determine if the UEFI boot volume includes a setup file; and
launch the setup file in response to determining that the UEFI boot volume includes the setup file; and
wherein the setup file is executable by the processor to set a first configuration setting of the information handling system based upon the first information included in the setup file;
wherein the setup file is further executable to:
read a second configuration setting of the information handling system;
determine that the second configuration setting has been changed based upon second information included in the setup file; and
provide an error indication that the configuration setting has been changed.

14. The information handling system of claim 13, wherein the setup file is further executable to:
set the second configuration setting based upon the second information.

15. The information handling system of claim 13, wherein:
the setup file has a first predetermined file name; and
in determining if the UEFI boot volume includes the setup file, the UEFI code is further executable to search the UEFI boot volume for the first predetermined file name.

16. The information handling system of claim 15, wherein the setup file is further executable to:
rename the setup file to a second predetermined file name after setting the first configuration setting.

17. The information handling system of claim 16, wherein the UEFI code is further executable to:
reboot the information handling system; and
determine that the UEFI boot volume does not include the setup file based upon the renaming of the setup file.

* * * * *